United States Patent
Lepretre et al.

(10) Patent No.: US 10,655,501 B2
(45) Date of Patent: May 19, 2020

(54) TURBINE RING ASSEMBLY WITHOUT COLD ASSEMBLY CLEARANCE

(71) Applicants: SAFRAN CERAMICS, Le Haillan (FR); SAFRAN AIRCRAFT ENGINES, Paris (FR)

(72) Inventors: Gilles Lepretre, Saint Aubin de Medoc (FR); Thierry Tesson, Bordeaux (FR); Adéle Lyprendi, Bordeaux (FR); Thomas Revel, Bordeaux (FR)

(73) Assignees: SAFRAN CERAMICS, Le Haillan (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/086,899

(22) PCT Filed: Mar. 20, 2017

(86) PCT No.: PCT/FR2017/050639
§ 371 (c)(1),
(2) Date: Sep. 20, 2018

(87) PCT Pub. No.: WO2017/162967
PCT Pub. Date: Sep. 28, 2017

(65) Prior Publication Data
US 2019/0101027 A1    Apr. 4, 2019

(30) Foreign Application Priority Data

Mar. 21, 2016 (FR) ..................................... 16 52392

(51) Int. Cl.
*F01D 25/24* (2006.01)
(52) U.S. Cl.
CPC ......... *F01D 25/243* (2013.01); *F01D 25/246* (2013.01); *F05D 2220/32* (2013.01);
(Continued)

(58) Field of Classification Search
None
See application file for complete search history.

(56) References Cited

U.S. PATENT DOCUMENTS 4,127,357 A    11/1978 Patterson
9,587,517 B2 *  3/2017 Vetters .................. F01D 25/246
(Continued)

FOREIGN PATENT DOCUMENTS

| WO | WO 2006/136755 A2 | 12/2006 |
| WO | WO 2015/191186 A1 | 12/2015 |
| WO | WO-2015191186 A1 * | 12/2015 |

OTHER PUBLICATIONS

International Preliminary Report on Patentability and the Written Opinion of the International Searching Authority as issued in International Patent Application No. PCT/FR2017/050639, dated Sep. 25, 2018.
(Continued)

*Primary Examiner* — David E Sosnowski
*Assistant Examiner* — Jason A Fountain
(74) *Attorney, Agent, or Firm* — Pillsbury Winthrop Shaw Pittman LLP

(57) ABSTRACT

A turbine ring assembly includes ring sectors made of ceramic matrix composite material forming a turbine ring and a ring support structure having first and second annular flanges, each ring sector having first and second tabs held between the flanges. First and second holder elements secured to the first annular flange being received in first and second openings in the first tab, while first and second holder elements secured to the second annular flange are in first and second openings in the second tab. Radial clearance is being present when cold between the openings and the portions of the holder elements present in the openings. The first and second annular flanges include, on their faces facing the first and second tabs, a plurality of thrust portions distributed in (Continued)

circumferential manner over the flanges, the ends of the tabs, when cold, being in radial abutment against two thrust portions.

7 Claims, 11 Drawing Sheets

(52) U.S. Cl.
CPC .... *F05D 2230/644* (2013.01); *F05D 2240/14* (2013.01); *F05D 2260/30* (2013.01); *F05D 2300/6033* (2013.01); *Y02T 50/672* (2013.01)

(56) References Cited

U.S. PATENT DOCUMENTS

| | | | | |
|---|---|---|---|---|
| 10,030,541 | B2* | 7/2018 | Vetters | F01D 25/246 |
| 10,294,809 | B2* | 5/2019 | Vetters | F01D 11/08 |
| 10,309,257 | B2* | 6/2019 | Sippel | F01D 25/246 |
| 2008/0178465 | A1 | 7/2008 | Schiavo et al. | |
| 2012/0027572 | A1 | 2/2012 | Denece et al. | |
| 2014/0308116 | A1 | 10/2014 | Witz et al. | |
| 2016/0186611 | A1* | 6/2016 | Vetters | F01D 25/246 415/173.2 |
| 2016/0258304 | A1* | 9/2016 | Sippel | F01D 25/246 |
| 2017/0002674 | A1* | 1/2017 | Vetters | F01D 25/246 |
| 2018/0080343 | A1* | 3/2018 | Groleau | F01D 11/08 |
| 2018/0087405 | A1* | 3/2018 | Quennehen | F01D 25/246 |
| 2018/0142572 | A1* | 5/2018 | Quennehen | F01D 11/08 |
| 2018/0149034 | A1* | 5/2018 | Roussille | F01D 11/08 |
| 2018/0156068 | A1* | 6/2018 | Roussille | F01D 11/08 |
| 2018/0156069 | A1* | 6/2018 | Quennehen | F01D 11/08 |
| 2018/0363506 | A1* | 12/2018 | Tesson | F01D 25/005 |
| 2018/0363507 | A1* | 12/2018 | Roussille | F01D 25/246 |

OTHER PUBLICATIONS

International Search Report as issued in International Patent Application No. PCT/FR2017/050639, dated Jun. 14, 2017.

* cited by examiner

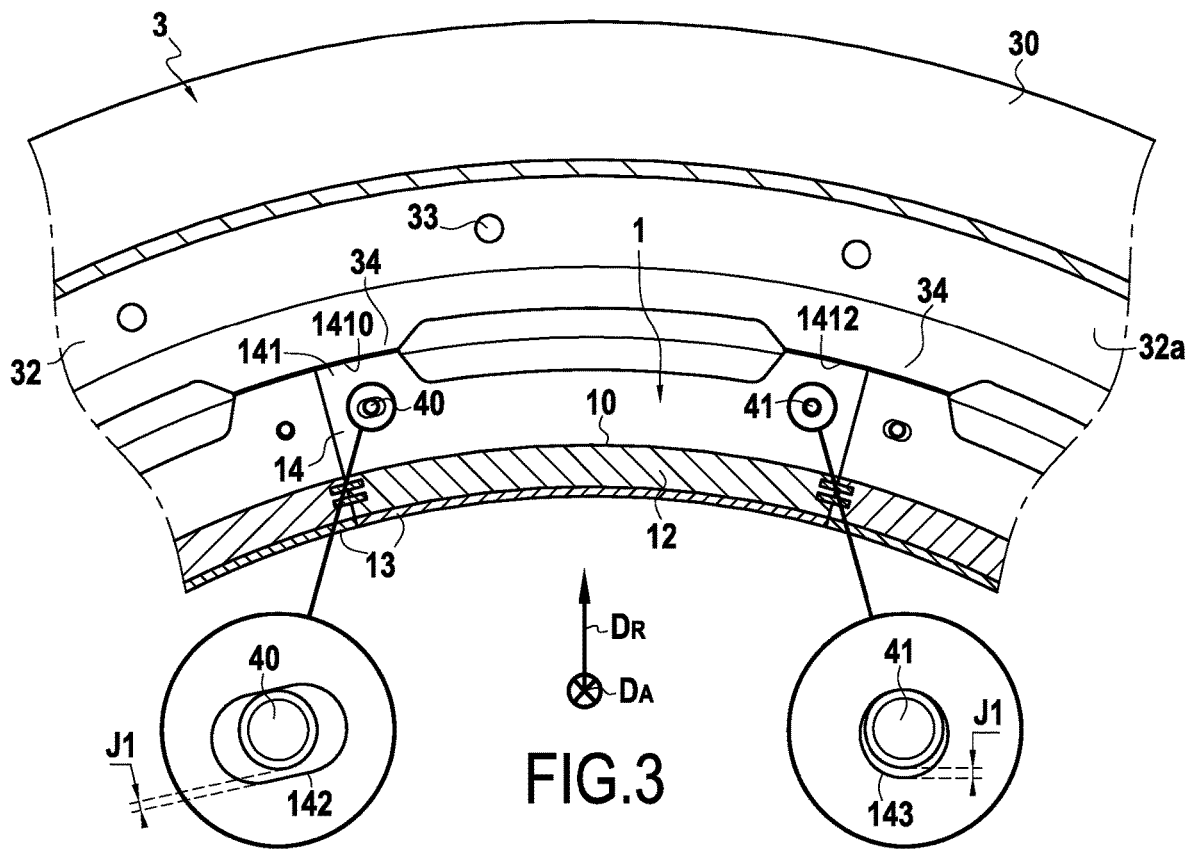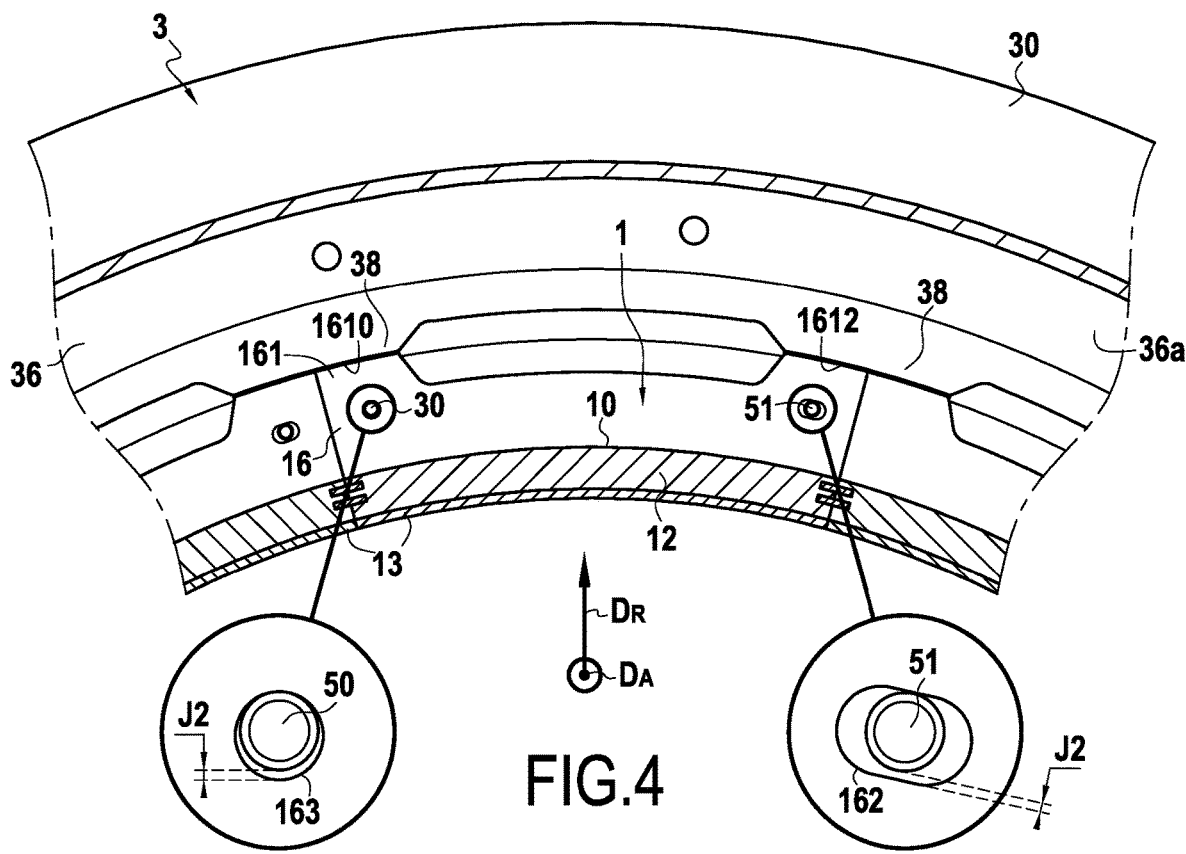

TURBINE RING ASSEMBLY WITHOUT COLD ASSEMBLY CLEARANCE

CROSS REFERENCE TO RELATED APPLICATIONS

This application is the U.S. National Stage of PCT/FR2017/050639 filed Mar. 20, 2017, which in turn claims priority to French Application No. 1652392, filed Mar. 21, 2016. The contents of both applications are incorporated herein by reference in their entirety.

BACKGROUND OF THE INVENTION

The field of application of the invention is in particular that of gas turbine aeroengines. Nevertheless, the invention is applicable to other turbine engines, e.g. industrial turbines.

Ceramic matrix composite (CMC) materials are known for conserving their mechanical properties at high temperatures, which makes them suitable for constituting hot structural elements.

In gas turbine aeroengines, improving efficiency and reducing certain polluting emissions both lead to seeking to obtain operation at ever higher temperatures. For turbine ring assemblies that are made entirely out of metal, it is necessary to cool all of the elements of the assembly, and in particular the turbine ring, which is subjected to very hot streams, typically at temperatures higher than those that can be withstood by the metal material. Such cooling has a significant impact on the performance of the engine, since the cooling stream that is used is taken from the main stream through the engine. In addition, the use of metal for the turbine ring limits potential for increasing temperature in the turbine, even though that would enable the performance of aeroengines to be improved.

Furthermore, a metal turbine ring assembly deforms under the effect of temperature variations, thereby modifying clearances for the flow passage, and consequently modifying the performance of the turbine.

That is why proposals have already been made to use CMC for various hot portions of engines, particularly since CMC presents the additional advantage of density that is lower than the density of the refractory metals that are conventionally used.

Thus, making turbine ring sectors as a single piece of CMC is described in particular in Document US 2012/0027572. Ring sectors comprise an annular base with an inner face defining the inside face of the turbine ring and an outer face from which there extend two tab-forming portions with their ends engaged in housings in a metal ring support structure.

The use of CMC ring sectors makes it possible to reduce significantly the amount of ventilation that is needed for cooling the turbine ring. Nevertheless, holding ring sectors in position remains a problem, in particular in the face of differential expansions that can occur between the metal support structure and the CMC ring sectors. That is why it is necessary to provide a certain minimum amount of clearance between the assembled parts. Unfortunately, such clearance degrades good control over the shape of the passage and also the behavior of ring sectors in the event of contacting the tips of blades of the turbine. In addition, the presence of such clearance leads to problems with vibration.

OBJECT AND SUMMARY OF THE INVENTION

The invention seeks to avoid such drawbacks, and for this purpose it provides a turbine ring assembly comprising both a plurality of ring sectors made of ceramic matrix composite material to form a turbine ring, and also a ring support structure having first and second annular flanges, each ring sector having a portion forming an annular base with, in a radial direction of the turbine ring, an inner face defining the inside face of the turbine ring and an outer face from which there extend first and second tabs, the tabs of each ring sector being held between the two annular flanges of the ring support structure. The first tab of each ring sector includes first and second openings respectively receiving portions of first and second holder elements secured to the first annular flange, radial clearance being present when cold between the first and second openings in the first tab and the portions of the holder elements present in said first and second openings. The holder elements are made of a material having a coefficient of thermal expansion that is greater than the coefficient of thermal expansion of the ceramic matrix composite material of the ring sectors, the first opening presenting a shape that is oblong extending in the circumferential direction of the turbine ring. The second tab of each ring sector includes first and second openings receiving portions of third and fourth holder elements secured to the second annular flange, radial clearance being present when cold between the first and second openings in the second tab and the portions of the holder elements present in said first and second openings. The holder elements are made of a material having a coefficient of thermal expansion that is greater than the coefficient of thermal expansion of the ceramic matrix composite material of the ring sectors, the first opening presenting a shape that is oblong extending in the circumferential direction of the turbine ring, the first and second openings of the first tab being in axial alignment with the first and second openings of the second tab. The first annular flange includes on its face facing the first tab of each ring sector a plurality of thrust portions distributed circumferentially over the first flange, the end of the first tab of each ring sector when cold being in radial abutment against two thrust portions. The second annular flange includes on its face facing the second tab of each ring sector a plurality of thrust portions distributed in circumferential manner over the second flange, the end of each second tab of each ring sector when cold being in radial abutment against two thrust portions.

Because of the plurality of thrust portions present on the annular flanges of the ring support structure, it is possible to hold the ring sectors without clearance when they are assembled while cold on the ring support structure, the ring sectors being held firstly by contact between the holder elements secured to the annular flanges of the ring support structure and the openings present in the tabs of the ring sectors, and secondly by contact between the thrust portions present on the annular flanges of the ring support structure and the tabs of the ring sectors. The turbine ring assembly of the invention is also remarkable in that it nevertheless makes it possible to arrange for static clearance when cold between the holder elements secured to the annular flanges of the ring support structure and the openings present in the tabs of the ring sectors in zones of the holder elements that are different from their zones of contact with the openings. It is thus possible to compensate for the loss of retention of the thrust portions when hot due to the expansion of the ring support structure by means of the expansion of the holder elements in the openings in the tabs of the ring sectors reducing the static clearance that is present when cold.

According to a particular characteristic of the turbine ring assembly of the invention, the first and second holder elements are formed respectively by first and second pegs secured to the first annular flange and in that the third and fourth holder elements are formed respectively by third and fourth pegs secured to the second annular flange.

In a first particular aspect of the turbine ring assembly of the invention, the thrust portions present on the first and second annular flanges are spaced apart from each other by a recessed portion extending in a circumferential direction. This recess serves to facilitate assembling the ring sectors on the ring support structure.

In a second particular aspect of the turbine ring assembly of the invention, it has a plurality of adjustable eccentric clamping elements, each clamping element having a clamp fastened eccentrically on the clamping element, each clamp forming a thrust portion present on the first and second annular flanges. By using eccentric clamping elements, it is possible to adjust thrust while cold between the ring sectors and the ring support structure.

In a third particular aspect of the turbine ring assembly of the invention, the first tab of each ring sector has two thrust surfaces in contact respectively with two thrust portions of the first annular flange, the two thrust surfaces extending in a common first thrust plane, the top edge of the first opening of oblong shape being in alignment with the first thrust plane, the top portion of the second opening being tangential with said first thrust plane. Likewise, the second tab of each ring sector has two thrust surfaces in contact respectively with two thrust portions of the second annular flange, the two thrust surfaces extending in a common second thrust plane, the top edge of the first opening of oblong shape being in alignment with the second thrust plane, the top portion of the second opening being tangential with said second thrust plane. This alignment of the contact zones on a thrust plane serves to avoid any relative movement in the radial direction associated with the differences in coefficients of thermal expansion, and to conserve the same contact zones both when cold and when hot.

In a fourth particular aspect of the turbine ring assembly of the invention, the second opening of the first tab of each ring sector presents an oblong shape, the top edge of the second opening of oblong shape being in alignment with the first thrust plane, and wherein the second opening of the second tab of each ring sector presents an oblong shape, the top edge of the second opening of oblong shape being in alignment with the second thrust plane, the end of the first tab of each ring sector including a recess situated between the two thrust surfaces and receiving a centering element secured to the first annular flange, the end of the second tab of each ring sector including a recess situated between the two thrust surfaces and receiving a centering element secured to the second annular flange. By using two openings of oblong shape in each tab of the ring sectors, relative movement between the ring support structure and the ring sectors is made symmetrical. This serves to conserve good coincidence between the middle axis of each ring sector and the equivalent radius of the ring support structure. The centering element serves to avoid the ring sectors moving off-center during thermal expansions.

In a fifth particular aspect of the turbine ring assembly of the invention, the first and second holder elements secured to the first radial flange, and the third and fourth holder elements secured to the second radial flange are each formed by an adjustable eccentric clamping element. By using eccentric clamping elements for each holder element, the capacity for adjusting the radial height of the ring sectors relative to the ring support structure is further increased and consequently so is the capacity for adjusting the clearance between the ring sectors.

BRIEF DESCRIPTION OF THE DRAWINGS

The invention can be better understood on reading the following description given by way of non-limiting indication and with reference to the accompanying drawings, in which:

FIG. 3 is a section view of the FIG. 1 turbine ring assembly on section plane III shown in FIG. 1;

FIG. 4 is a section view of the FIG. 2 turbine ring assembly on section plane VI shown in FIG. 2;

DETAILED DESCRIPTION OF EMBODIMENTS

Figure 1:
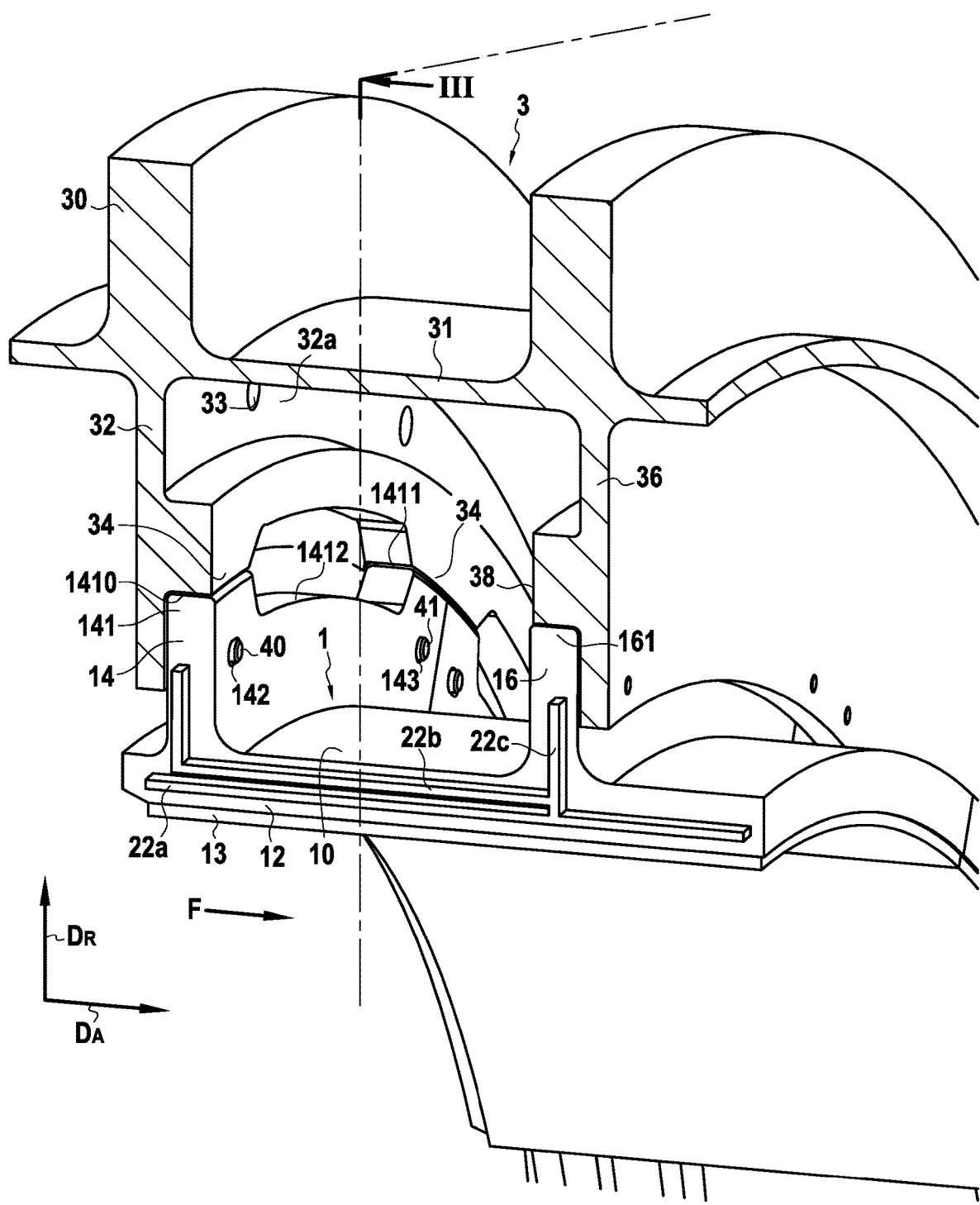
FIG. 1 is a first diagrammatic perspective view of an embodiment of a turbine ring assembly of the invention.
Figure 2:
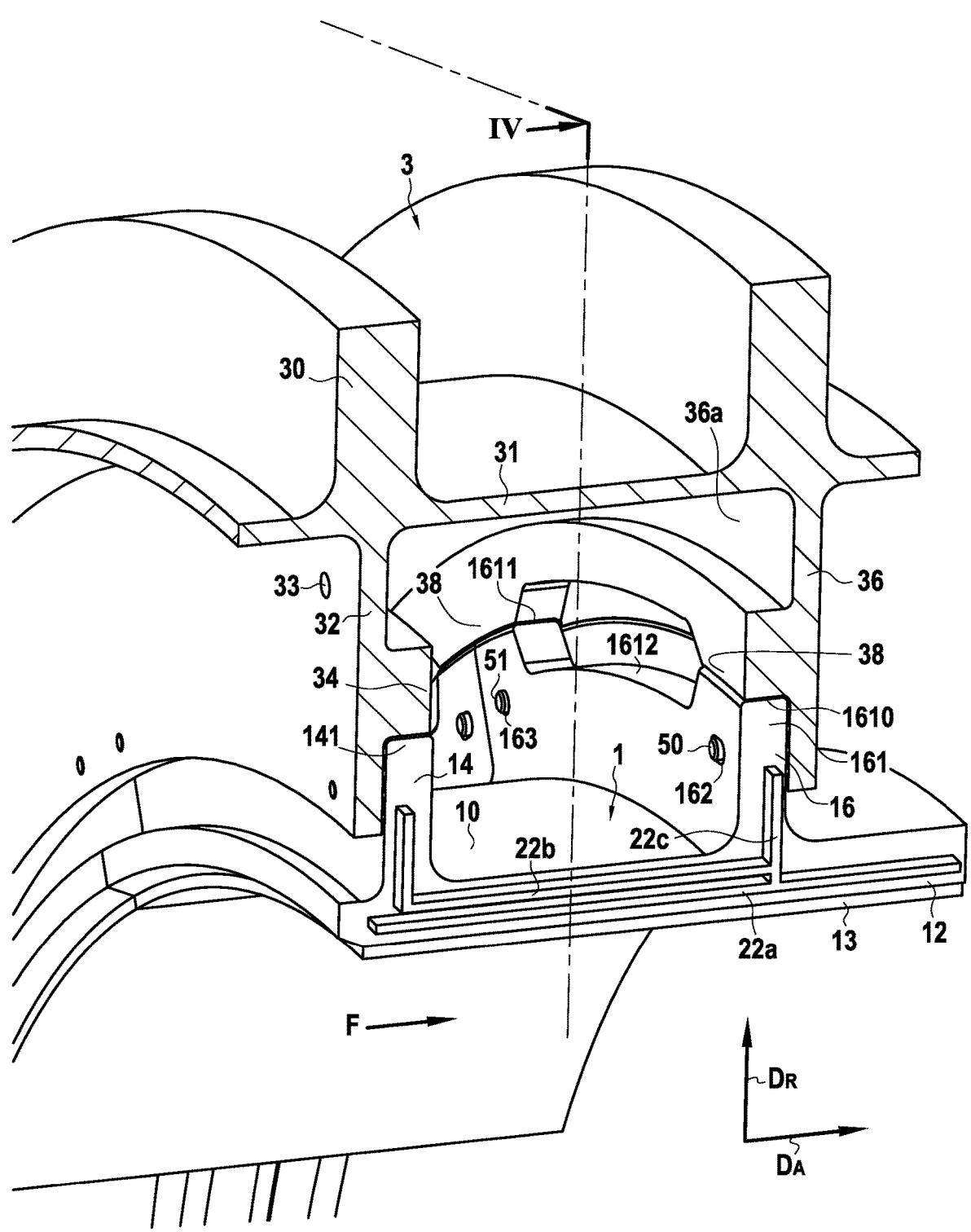
FIG. 2 is a second diagrammatic perspective view of the FIG. 1 turbine ring assembly.

FIGS. 1 and 2 show a high-pressure turbine ring assembly comprising both a turbine ring 1 made of ceramic matrix composite (CMC) material, and also a metal ring support structure 3. The turbine ring 1 surrounds a set of rotary blades (not shown). The turbine ring 1 is made up of a plurality of ring sectors 10, FIGS. 1 and 2 being views in radial section. Arrow $D_A$ shows the axial direction of the turbine ring 1, while arrow $D_R$ shows the radial direction of the turbine ring 1.

In a plane defined by the axial and radial directions $D_A$ and $D_R$, each ring sector 10 presents a section that is substantially in the shape of an upside-down Greek letter Pi ($\pi$). Each ring sector 10 comprises an annular base 12 with an inner face in the radial direction $D_R$ of the ring that is coated in a layer 13 of abradable material for defining the gas stream flow passage through the turbine. Upstream and downstream tabs 14 and 16 extend from the outer face of the annular base 12 in the radial direction $D_R$. The terms "upstream" and "downstream" are used herein relative to the flow direction of the gas stream through the turbine (arrow F).

The ring support structure 3, which is secured to a turbine casing 30, includes an upstream annular radial flange 32 having on its face 32a facing the upstream tabs 14 of the ring sectors 10, a plurality of thrust portions 34 that are distributed circumferentially over the flange. More precisely, each thrust portion 34 extends in the axial direction $D_A$ so as to project from the face 32a of the upstream annular radial flange 32 facing the upstream tabs 14 of the ring sectors 10. When cold, the end 141 of the upstream tab 14 of each ring sector 10 is in contact with two thrust portions 34 of the upstream annular radial flange 32. More precisely, the top surface of the end 141 in the radial direction $D_R$ is in contact when cold with the bottom surfaces of the thrust portions 34 in the radial direction $D_R$, thereby providing radial abutment between the end 141 and the thrust portions 34.

In the present invention, the term "when cold" is used to mean the temperature at which the ring assembly is to be found when the turbine is not in operation, i.e. an ambient temperature that may for example be about 25° C. In the presently-described example, the end 141 of each tab 14 has first and second thrust surfaces 1410 and 1411 respectively in contact with two thrust portions 34. A recessed portion 1412 is present between the two thrust surfaces 1410 and 1411 so as to facilitate assembling the ring sectors 10 between the flanges of the ring support structure 3.

At the downstream end, the ring support structure includes a downstream annular radial flange 36 having on its face 36a facing the downstream tabs 16 of the ring sectors 10 a plurality of thrust portions 38 distributed in circumferential manner over the flange. More precisely, each thrust portion 38 extends in the axial direction $D_A$ so as to project from the face 36a of the downstream annular radial flange 36 that faces the downstream tabs 16 of the ring sectors 10. When cold, the end 161 of the downstream tab 16 of each ring sector 10 is in contact with two thrust portions 38 of the downstream annular radial flange 36. More precisely, the top surface of the end 161 of the radial direction $D_R$ is in contact when cold with the bottom surfaces of thrust portions 38 in the radial direction $D_R$, thereby establishing radial abutments between the ends 161 and the thrust portions 38.

In the presently-described example, the end 161 of each tab 16 has first and second thrust surfaces 1610 and 1611 respectively in contact with two thrust portions 38. A recessed portion 1612 is present between the two thrust surfaces 1610 and 1611 so as to facilitate assembling the ring sectors 10 between the flanges 32 and 36 of the ring support structure 3.

Figure 5:
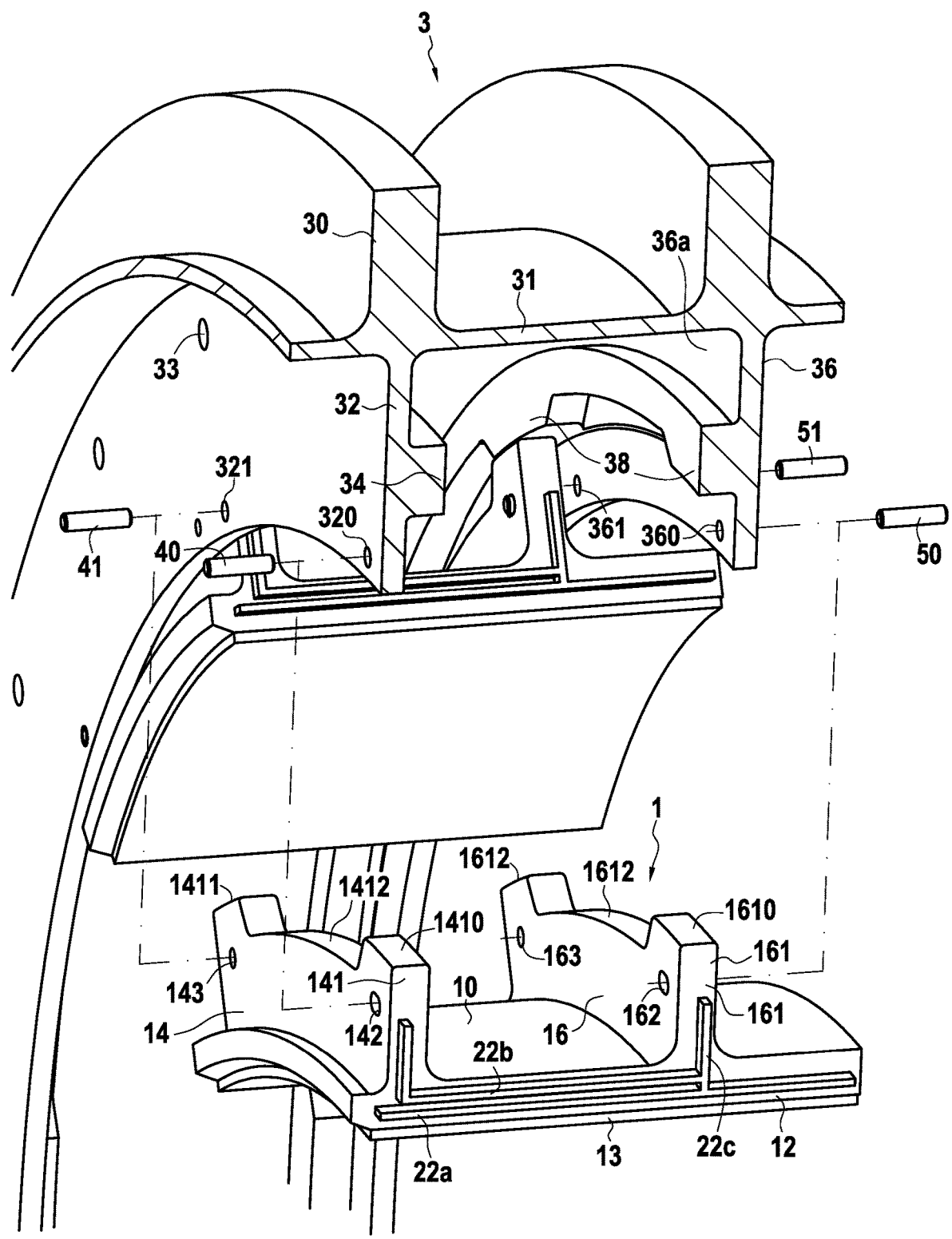
FIG. 5 is a diagram showing how a ring sector is assembled in the ring support structure of the assembly of FIGS. 1 to 4.

The downstream tab 14 of each ring sector 10 has a first opening 142 that receives a portion of a first holder element, specifically a peg 40, secured to the upstream annular radial flange 32, and a second opening 143 that receives a portion of a second holder element, specifically a peg 41, secured to the upstream annular radial flange 32. The pegs 40 and 41 are mounted respectively in orifices 320 and 321 present in the upstream annular radial flange 32 (FIG. 5). The pegs 40 and 41 are shrink-fits in the orifices 320 and 321 of the upstream annular radial flange 32 with metal fits known as H6-P6 fits or other force-fits that enable these elements to be retained when cold.

Radial clearance J1 is present when cold between the first and second openings 142, 143 in the upstream tab 14 and the portions of the pegs 40, 41 that are present in said first and second openings, the clearance J1 being present in the portions of the openings 142 and 143 that are at the bottom in the radial direction $D_R$ (FIG. 3). The pegs 40 and 41 are in contact with the portions of the respective openings 142 and 143 that are at the top in the radial direction $D_R$, i.e. in a zone radially opposite from the zone where the clearance J1 is present. It is thus possible to hold the ring sectors without clearance where they are assembled when cold on the ring support structure, while still also providing static clearance when cold between the holder elements secured to the annular flanges of the ring support structure and the openings present in the tabs of the ring sectors at the portions of the holder elements that are opposite from their portions in contact with the openings so as to be able to accommodate differential expansions of the holder elements relative to the ring sectors.

In the presently-described embodiment, the first opening 142 is of a shape that is oblong extending in the circumferential direction of the turbine ring, while the second opening 143 is cylindrical in shape.

The pegs 40 and 41 are made of a material having a coefficient of thermal expansion that is greater than the coefficient of thermal expansion of the ceramic matrix composite material of the ring sectors. The expansion of the pegs 40 and 41 in the first and second openings 142 and 143 respectively contributes to holding the ring sectors 10 when hot on the ring support structure 3, the clearance J1 being reduced or eliminated by the expansion of the pegs 40 and 41. The term "when hot" is used herein to mean the temperatures to which the ring assembly is subjected while the turbine is in operation, which temperatures may lie in the range 600° C. to 900° C.

The downstream tab 16 of each ring sector 10 has a first opening 162 receiving a portion of a third holder element, specifically a peg 50, that is secured to the downstream annular radial flange 36, and a second opening 163 that receives a portion of a fourth holder element, specifically a peg 51, that is secured to the downstream annular radial flange 36. The pegs 50 and 51 are mounted respectively in the orifices 360 and 361 present in the downstream annular radial flange 36. The pegs 50 and 51 are shrink-fits in the orifices 360 and 361 of the downstream annular radial flange 36 with metal fits known as H6-P6 fits or other force-fits that enable these elements to be retained when cold.

Radial clearance J2 is present when cold between the first and second openings 162, 163 in the downstream tab 16 and the portions of the pegs 50, 51 that are present in said first and second openings, the clearance J2 being present in the portions of the openings 162 and 163 that are at the bottom in the radial direction $D_R$ (FIG. 4). The pegs 50 and 51 are in contact with the respective portions of the openings 162 and 163 that are at the top in the radial direction $D_R$, i.e. in zones that are radially opposite from the zones where the clearance J2 is present. It is thus possible to hold the ring sectors without clearance where they are assembled while cold on the ring support structure, while also providing static clearance when cold between the holder elements secured to the annular flanges of the ring support structure and the openings present in the tabs of the ring sectors at those portions of the holder elements that are opposite from the portions in contact with the openings so as to be able to accommodate differential expansions of the holder elements relative to the ring sectors.

In the presently-described embodiment, the first opening 162 is of a shape that is oblong extending in the circumferential direction of the turbine ring, while the second opening 163 presents a cylindrical shape.

The pegs 50 and 51 are made of a material having a coefficient of thermal expansion that is greater than the coefficient of thermal expansion of the ceramic matrix composite material of the ring sectors. The expansion of the pegs 50 and 51 in the first and second openings 162 and 163 respectively contributes to holding the ring sectors 10 when hot on the ring support structure 3, the clearance J2 being reduced or eliminated by the expansion of the pegs 50 and 51.

The first openings of oblong shape 142 and 162 present respectively in the tabs 14 and 16 are axially aligned with the axis of the turbine ring 1, which is parallel to the axial direction $D_A$. Likewise, the second openings 163 and 163 present respectively in the tabs 14 and 16 are axially aligned relative to the axis of the turbine ring 1.

In addition, sealing between sectors is provided by sealing tongues received in grooves that face each other in the facing edges of two neighboring ring sectors. A tongue 22a extends over nearly the entire length of the annular base 12 in its middle portion. Another tongue 22b extends along the tab 14 and over a portion of the annular base 12. Another tongue 22c extends along the tab 16. At one end, the tongue 22c comes into abutment against the tongue 22a and against the tongue 22b. The tongues 22a, 22b, and 22c may for example be made of metal and they may be mounted with clearance when cold in their housings so as to perform the sealing function at the temperatures that are encountered in operation.

In conventional manner, ventilation orifices 33 formed in the flange 32 serve to deliver cooling air to the outside of the turbine ring 10.

There follows a description of a method of making a turbine ring assembly corresponding to the assembly shown in FIGS. 1 and 2.

Each above-described ring sector 10 is made of ceramic matrix composite (CMC) material by forming a fiber preform having a shape close to the shape of the ring sector and by densifying the ring sector with a ceramic matrix.

In order to make the fiber preform, it is possible to use yarns made of ceramic fibers, e.g. yarns made of SiC fibers such as those sold by the Japanese supplier Nippon Carbon under the name "Nicalon", or yarns made of carbon fibers.

The fiber preform is advantageously made by three-dimensional weaving or by multilayer weaving with zones of non-interlinking being provided so as to enable portions of the preforms corresponding to the tabs 14 and 16 of the sectors 10 to be folded out.

The weave may be of the interlock type, as shown. Other three-dimensional or multilayer weaves may be used, such as for example multi-plain or multi-satin weaves. Reference may be made to Document WO 2006/136755.

After weaving, the blank is shaped in order to obtain a ring sector preform that is consolidated and densified by a ceramic matrix, which densification may be performed in particular by chemical vapor infiltration (CVI), which is itself well known.

A detailed example of fabricating ring sectors out of CMC is described in particular in Document US 2012/0027572.

The ring support structure 3 is made of a metal material such as a Waspaloy® or Inconel 718 alloy.

Making of the turbine ring assembly continues by mounting the ring sectors 10 on the ring support structure 3. As shown in FIG. 5, the tabs 14 and 16 of each ring sector 10 are positioned between the upstream and downstream annular radial flanges 32 and 36 so as to place the two thrust surfaces 1410 and 1411 present at the end of the tab 14 in contact with the thrust portions 34 of the upstream annular radial flange 32, and the two thrust surfaces 1610 and 1611 present at the end of the tab 16 in contact with the thrust portions 38 of the downstream annular radial flange 36. Each ring sector 10 is also positioned in such a manner as firstly to bring the openings 142 and 143 of the tab 14 into alignment respective with the orifices 320 and 321 of the upstream annular radial flange 32, and secondly to bring the openings 162 and 163 of the tab 16 respectively into alignment with the orifices 360 and 361 of the downstream annular radial flange 36. The pegs 40, 41, 50, and 51 are then engaged in the respective openings and orifices as aligned in this way, each of the pegs 40, 41, 50, and 51 being a shrink-fit in a respective one of the orifices 320, 321, 360, and 361.

When cold, the ring sectors 10 are held firstly by the thrust portions 34 and 38 of the flanges 32 and 36 of the ring support structure 3 that are in contact respectively with the ends 141 and 161 of the tabs 14 and 16, and secondly by the pegs 40, 41, 50, and 51, each of which is in contact with the top portion of a respective one of the orifices 320, 321, 360, or 361. These two contact zones (thrust portions and pegs) against the ring sectors serve to hold the ring sectors when cold on the ring support structure without assembly clearance, i.e. without any possibility of the ring sectors moving relative to the ring support structure.

When hot, as a result of expansion, the flanges of the ring support structure no longer serve to hold the ring sectors via the thrust portions 34 and 36. They are held while hot both by expansion of the pegs 40 and 41 in the openings 142 and 143 of the tab 14 reducing the clearance J1, and by expansion of the pegs 50 and 51 in the openings 162 and 163 of the tab 16 reducing the clearance J2.

FIGS. 6 to 9 show another embodiment of a high-pressure turbine ring assembly of the invention that differs from the embodiment described above with reference to FIGS. 1 to 5 in that the stationary thrust portions on the flanges of the ring support structure are replaced by eccentric clamping elements, and in that the contact zones between the tabs of the ring sectors and the flanges of the ring support structure are coplanar, these two differences being implemented in separate or combined manner in a given turbine ring assembly, with this being done in combination with the above-described embodiments.

Figure 6:
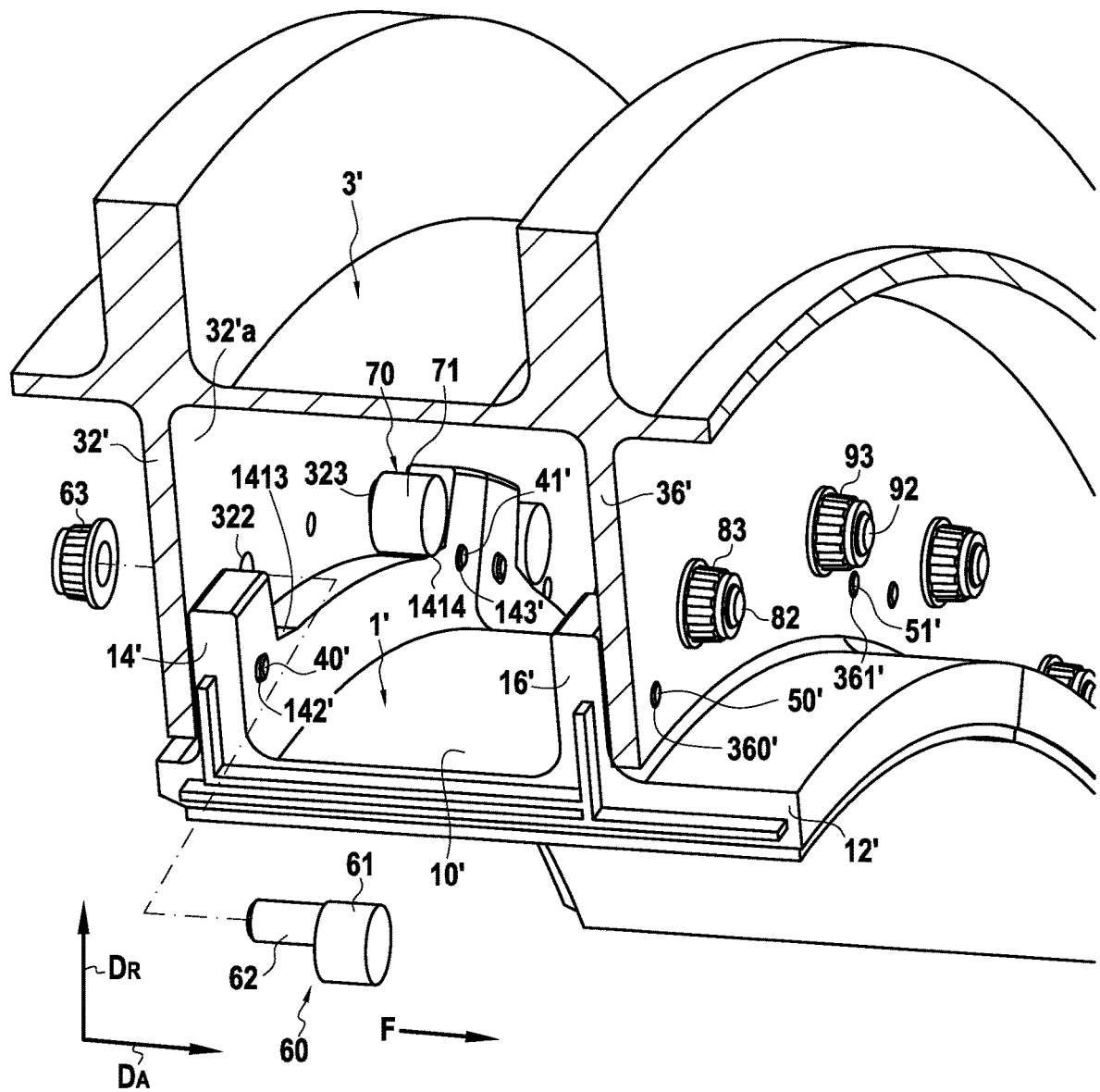
FIG. 6 is a first diagrammatic perspective view of another embodiment of a turbine ring assembly of the invention.
Figure 7:
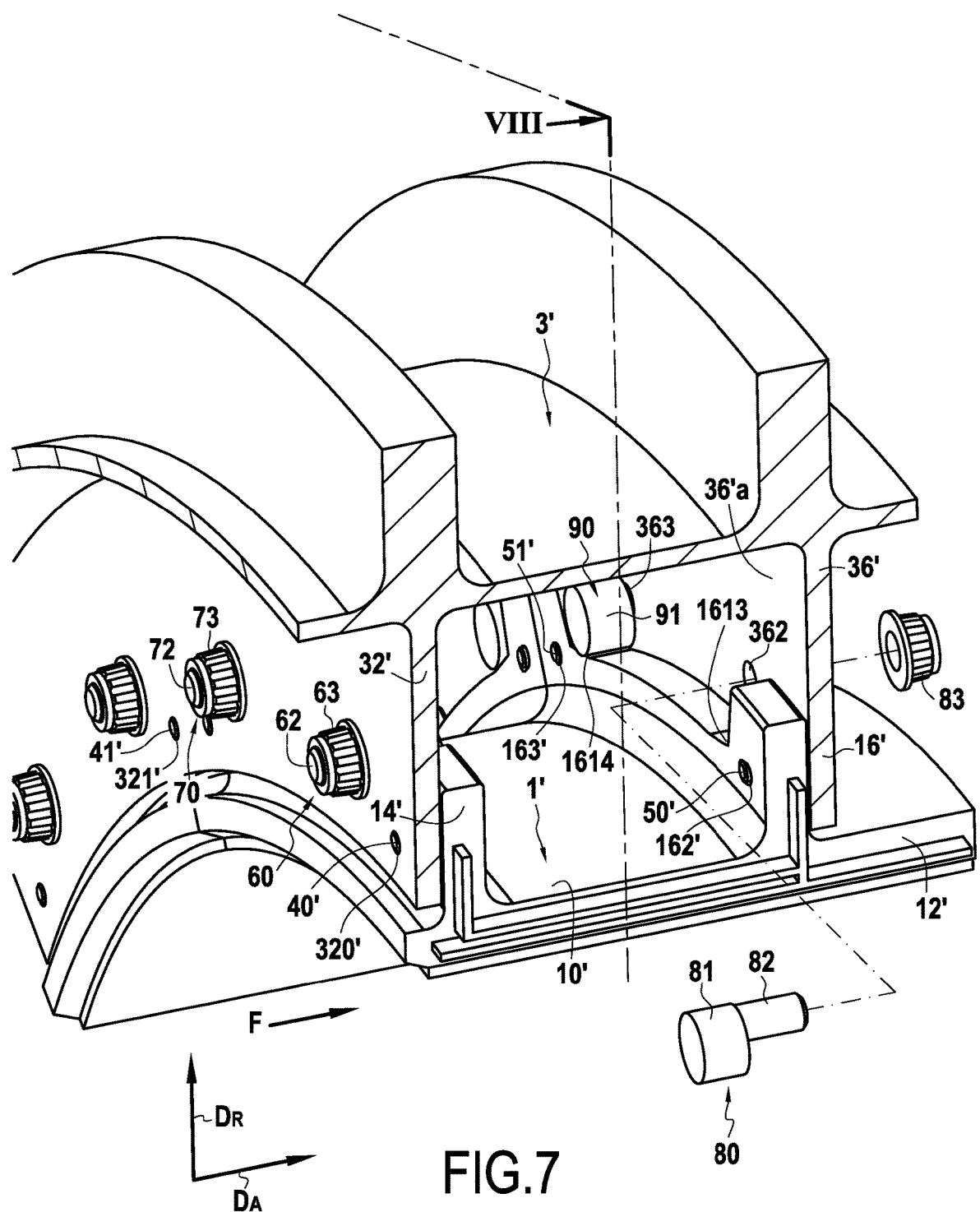
FIG. 7 is a second diagrammatic perspective view of the FIG. 6 turbine ring assembly.

More precisely, as shown in FIGS. 6 and 7, the upstream annular radial flange 32' of the ring support structure 3' has, on its face 32a' facing the upstream tabs 14' of the ring sectors 10', a plurality of clamps 61 and 71 belonging to respective eccentric clamping elements 60 and 70 and corresponding to portions of the clamps that thrust against the ring sectors. Each eccentric clamping element 60 or 70 has a respective threaded shank 62 or 72 that is placed in a respective orifice 322 or 323 present in the flange 32'. The clamps 61 and 71 are cylindrical in shape in this example and each is fastened eccentrically on the corresponding threaded shank 62, 72. The clamps 61, 71 present beside the face 32a' facing the upstream tab 14' are held in positions that are determined by tightening respective nuts 63, 73 on the respective threaded shanks 62, 72.

Thrust surfaces 1413 and 1414 present on the upstream tab 14' are in contact when cold respectively with the two clamps 61 and 71 present on the face 32a' of the flange 32' facing the upstream tab 14' of each ring sector 10'. More precisely, each clamp 61, 71 extends in the axial direction $D_A$ projecting from the face 32a' of the upstream annular radial flange 32' facing the upstream tabs 14' of the ring sectors 10'. The thrust surfaces 1413 and 1414 are in contact when cold respectively with the bottom surfaces of the clamps 61 and 71 in the radial direction $D_R$, thus providing radial abutment of the thrust surfaces 1413 and 1414 against the clamps 61 and 71.

At the downstream end, the downstream annular radial flange 36' of each ring support structure 3' has, on its face 36a' facing the downstream tabs 16' of the ring sectors 10', a plurality of clamps 81 and 91 belonging to respective eccentric clamping elements 80 and 90 and corresponding to portions of the clamps that thrust against the ring sectors. Each eccentric clamping element 80, 90 has a respective threaded shank 82, 92 that is received in a respective orifice 362, 363 present in the flange 36'. The respective clamps 81, 91 are in the form of cylindrical pegs in this example and they are fastened eccentrically to the respective threaded shanks 82, 92. The clamps 81, 91 present beside the face 36a' facing the downstream tab 16' are held in determined positions by tightening respective nuts 83, 93 on the respective threaded shanks 82, 92.

Thrust surfaces 1613 and 1614 present on the downstream tab 16' are in contact when cold respectively with the two clamps 81 and 91 present on the face 36a' of the flange 36' facing the downstream tabs 16' of each of the ring sectors 10'. More precisely, each clamp 81, 91 extends in the axial direction $D_A$ projecting from the face 36a' of the downstream annular radial flange 36' facing the downstream tabs 16' of the ring sectors 10'. The thrust surfaces 1613 and 1614 are in contact when cold respectively with the bottom surfaces of the clamps 81 and 91 in the radial direction $D_R$, thereby providing radial abutment of the thrust surfaces 1613 and 1614 against the clamps 81 and 91.

By using eccentric clamping elements 60, 70, 80, and 90, it is possible to adjust the thrust when cold of the ring sectors against the ring support structure. The eccentric clamping elements may have shapes other than those described above, the clamps of these elements possibly being constituted by respective shoes (parts including flats) instead of cylindrical elements, for example.

Like the high-pressure turbine ring assembly described above with reference to FIGS. 1 to 5, the upstream tab 14' of each ring sector 10' includes a first opening 142' receiving a portion of a first holder element, specifically a peg 40', that is secured to the upstream annular radial flange 32', and a second opening 143' that receives a portion of a second holder element, specifically a peg 41', that is secured to the upstream annular radial flange 32'. The pegs 40' and 41' are mounted respectively in the orifices 320' and 321' present in the upstream annular radial flange 32'.

Radial clearance is present when cold between the first and second openings 142', 143' of the upstream tab 14' and the portions of the pegs 40', 41' present in said first and second openings, the clearance being present in the portions of the openings 142' and 143' that are at the bottom in the radial direction $D_R$ (not shown in FIGS. 6 to 9). The pegs 40' and 41' are in contact with the portions of the respective openings 142' and 143' that are at the top in the radial direction $D_R$, i.e. in zones that are radially opposite from the zones where the clearance is present. In the presently-described embodiment, the first opening 142' presents a shape that is oblong extending in the circumferential direction of the turbine ring, while the second opening 143' presents a cylindrical shape.

The pegs 40' and 41' are made of a material having a coefficient of thermal expansion greater than the coefficient of thermal expansion of the ceramic matrix composite material of the ring sectors. Expansion of the pegs 40' and 41' in the first and second openings 142' and 143' respectively contributes, when hot, to holding the ring sectors 10' on the ring support structure 3', the clearance being reduced or eliminated by expansion of the pegs 40' and 41'.

The downstream tab 16' of each ring sector 10' has a first opening 162' receiving a portion of a third holder element, specifically a peg 50', secured to the downstream annular radial flange 36', and a second opening 163' receiving a portion of a fourth holder element, specifically a peg 51', secured to the downstream annular radial flange 36'. The pegs 50' and 51' are mounted in the orifices 360' and 361' respectively that are present in the downstream annular radial flange 36'.

Figure 8:
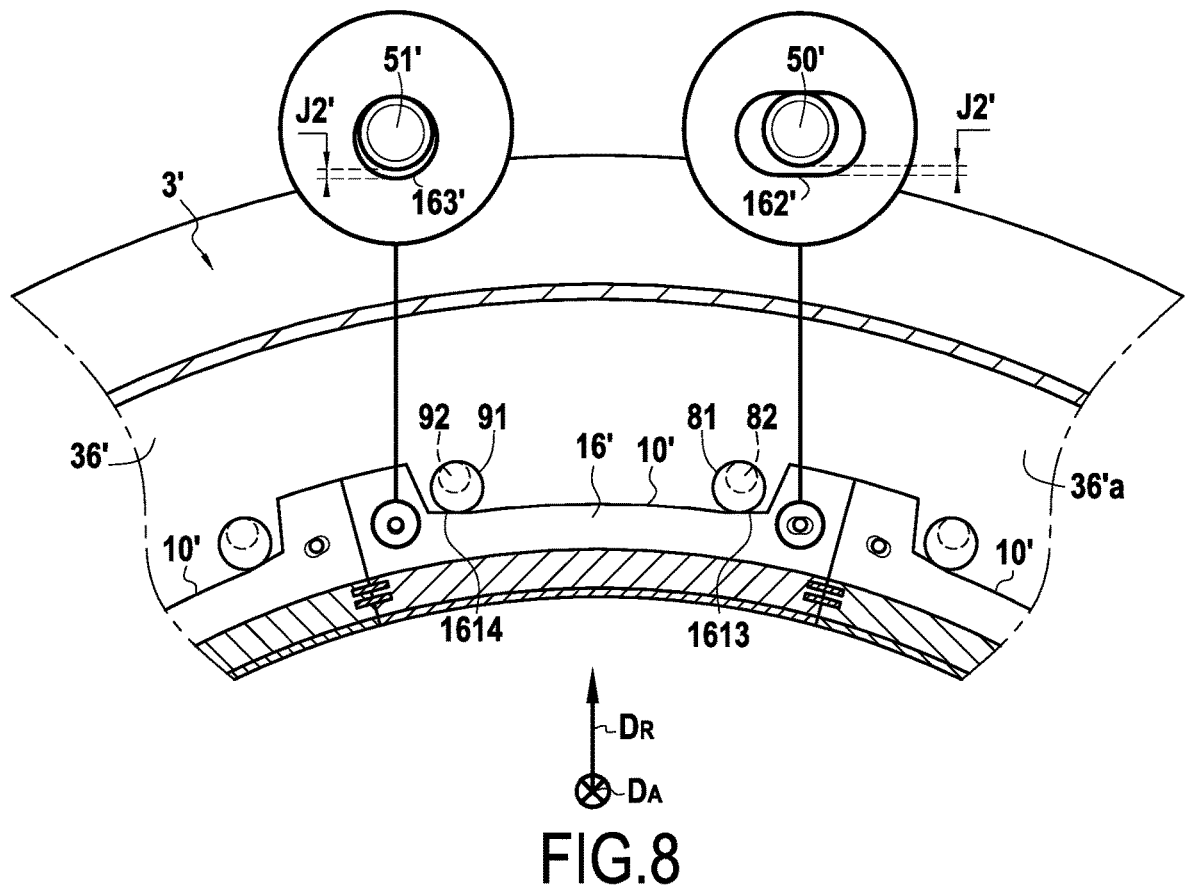
FIG. 8 is a section view of the FIG. 7 turbine ring assembly on section plane VIII shown in FIG. 7.

Radial clearance J2' is present when cold between the first and second openings 162', 163' of the downstream tab 16' and the portions of the pegs 50', 51' present in said first and second openings, the clearance J2' being present in the portions of the openings 162' and 163' that are at the bottom in the radial direction $D_R$ (FIG. 8). The pegs 50' and 51' are in contact with the portions of the openings 162' and 163' respectively that are at the top in the radial direction $D_R$, i.e. in zones that are radially opposite from the zones where the clearance is present. It is thus possible to hold the ring sectors without clearance where they are mounted while cold on the ring support structure, while providing static clearance when cold between the holder elements secured to the annular flanges of the ring support structure and the openings present in the tabs of the ring sectors in the portions of the holder elements that are opposite from those in contact with the openings so as to accommodate differential expansions of the holder elements relative to the ring sectors.

In the presently-described embodiment, the first opening 162' presents a shape that is oblong extending in the circumferential direction of the turbine ring, while the second opening 163' presents a cylindrical shape.

The pegs 50' and 51' are made of a material having a coefficient of thermal expansion greater than the coefficient of thermal expansion of the ceramic matrix composite material of the ring sectors. Expansion of the pegs 50' and 51' in the first and second openings 162' and 163' respectively contributes, when hot, to holding the ring sectors 10' on the ring support structure 3', the clearance J2' being reduced or eliminated by the expansion of the pegs 50' and 51'.

Figure 9:
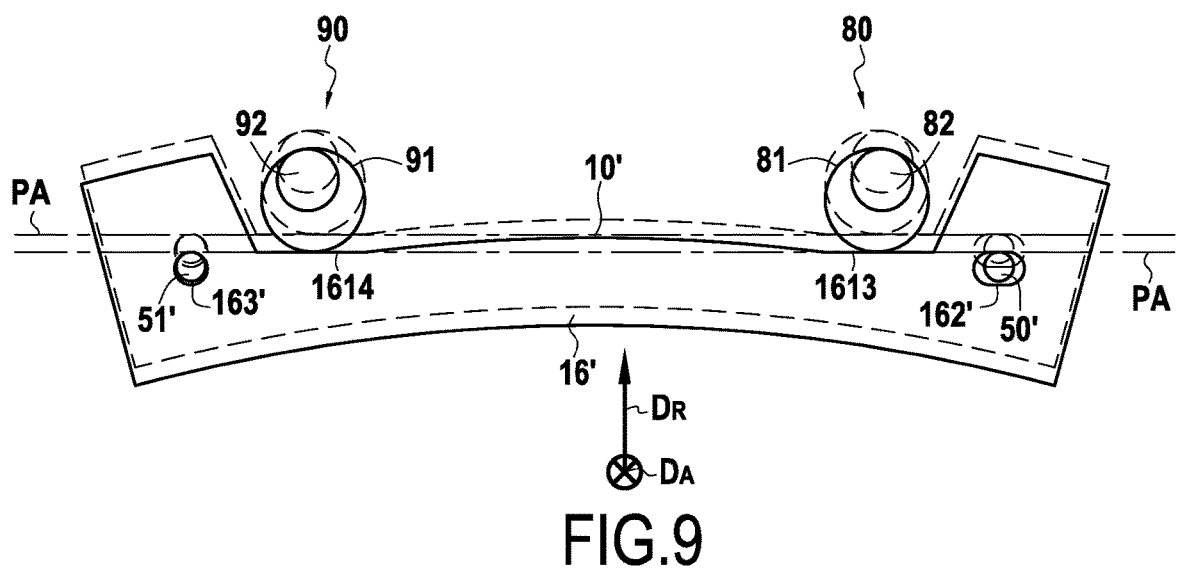
FIG. 9 is a section view of a ring sector of the turbine ring assembly of FIGS. 6 and 7.

As shown in FIG. 9, the two thrust surfaces 1613 and 1614 present on the downstream tab 16' extend in a common first thrust plane PA. The top edge of the first opening of oblong shape 162' present on the downstream tab 16' is in alignment with the first thrust plane PA, while the top portion of the second opening 163' present in the downstream tab 16' is tangential to the first thrust plane PA. Thus, all of the thrust points or zones between firstly the downstream annular radial flange 36' as constituted by the clamps 81 and 91 and secondly the pegs 50' and 51' on the downstream tab 16' of each ring sector 10' are in alignment on the same thrust plane PA. This alignment of the contact zones on a thrust plane serves to avoid any relative movement in the radial direction associated with differences in coefficients of thermal expansion, so as to conserve the same contact zones both when cold and when hot (the respective positions when cold and when hot of the contact zones between the thrust points of the downstream annular radial flange and the downstream tab being drawn respectively in continuous lines and in dashed lines in FIG. 9).

Likewise, the two thrust surfaces 1413 and 1414 present on the upstream tab 14' extend in a common second thrust plane (not shown in FIGS. 6 to 9). The top edge of the first opening 142' of oblong shape present in the upstream tab 14' is in alignment with the second thrust plane while the top portion of the second opening 143' present in the upstream tab 14' is tangential to the second thrust plane. Thus all of the thrust points or zones of the upstream annular radial flange 32' constituted firstly by the clamps 61 and 71 and secondly by the pegs 40' and 41' on the upstream tab 14' of each ring sector 10 are in alignment on the same thrust plane. This alignment of the contact zones on a thrust plane serves to avoid any relative movement in the radial direction associated with the differences in coefficients of thermal expansion, and to conserve the same contact zones both when cold and when hot.

FIGS. 10 to 14 show another embodiment of a high-pressure turbine ring assembly of the invention that differs from the assembly described with reference to FIGS. 6 to 9 in that firstly the openings present in each ring sector tab for receiving portions of holder elements secured to the annular flanges of the ring support structure are all oblong in shape, each ring sector tab further including a housing for a centering element that is likewise secured to the annular flanges of the ring structure, and secondly in that the holder elements that are to have portions present in the openings formed in the tabs of each ring sector are themselves eccentric clamping elements. These two differences may be implemented in separate or combined manner in a given turbine ring assembly, and in combination with the embodiments already described above.

More precisely, the upstream tab 14" of each ring sector 10" has a first opening 142" of oblong shape receiving a portion of a first holder element, specifically an eccentric clamping element 100 that is secured to the upstream annular radial flange 32", and a second opening 143" likewise of oblong shape that receives a portion of a second holder element, specifically an eccentric clamping element 110 secured to the upstream annular radial flange 32". Each eccentric clamping element 100, 110 comprises a threaded shank 102, 112 that is placed in a respective orifice 324, 325 present in the flange 32", the orifices 324, 325 having tapping for co-operating with the threads on the respective shanks 102, 112. A clamp 101, 111, specifically in the form of a cylindrical peg, is fastened in eccentric manner on the respective threaded shank 102, 112. The clamp 101, 111 present in the respective first and second openings 142", 143" is placed in a determined position by screwing its threaded shank 102, 112 into the respective orifice 324, 325, and it is held in this position by tightening a respective lock nut 103, 113 on the respective threaded shank 102, 112.

Radial clearance is present when cold between the first and second openings 142", 143" of the upstream tab 14" and the clamps 101, 111 present in said first and second openings (not shown in FIGS. 10 to 14). The clamps 101 and 111 are in contact with portions of the respective openings 142", 143" in the radial direction DR, i.e. in a zone where there is no clearance. It is thus possible to hold the ring sectors without clearance when they are mounted while cold on the ring support structure, while nevertheless providing static clearance when cold between the holder elements secured to the annular flanges of the ring support structure and the openings present in the tabs of the ring sectors.

In the presently-described embodiment, each of the first and second openings 143" and 143" presents a shape that is oblong extending in the circumferential direction of the turbine ring.

The eccentric clamping elements 100 and 110 are made of a material having a coefficient of thermal expansion that is greater than the coefficient of thermal expansion of the ceramic matrix composite material of the ring sectors. Expansion when hot of the clamps 101 and 111 in the first and second openings 142" and 143" contributes to holding the ring sectors 10" on the ring support structure 3", the clearance being reduced or eliminated by the expansion of the clamps 101 and 111.

The upstream tab 14" of each ring sector 10" also includes a housing, specifically a cutout 144, that receives a centering element, specifically a peg 120 that is secured to the upstream annular radial flange 32".

The downstream tab 16" of each ring sector 10" has a first opening 162" of oblong shape receiving a portion of a third holder element, specifically an eccentric clamping element 130 secured to the downstream annular radial flange 34", and a second opening 163" that is likewise of oblong shape and that receives a portion of a fourth holder element, specifically an eccentric clamping element 170 that is secured to the downstream annular radial flange 34". Each eccentric clamping element 130, 170 has a threaded shank 132, 172 that is received in a respective orifice 364, 365 present in the flange 36", each orifice 364, 365 having tapping for co-operating with the thread on a respective shank 132, 172. Respective clamps 131, 171, specifically in the form of cylindrical pegs, are fastened eccentrically to the respective threaded shanks 132, 172. The clamp 131, 171 respectively present in the first opening 162" or the second opening 163" is placed in a determined position by screwing the respective threaded shank 132, 172 into the respective orifice 364, 365, and it is held in this position by tightening a respective lock nut 133, 173 on the respective threaded shank 102, 112.

Figure 13:
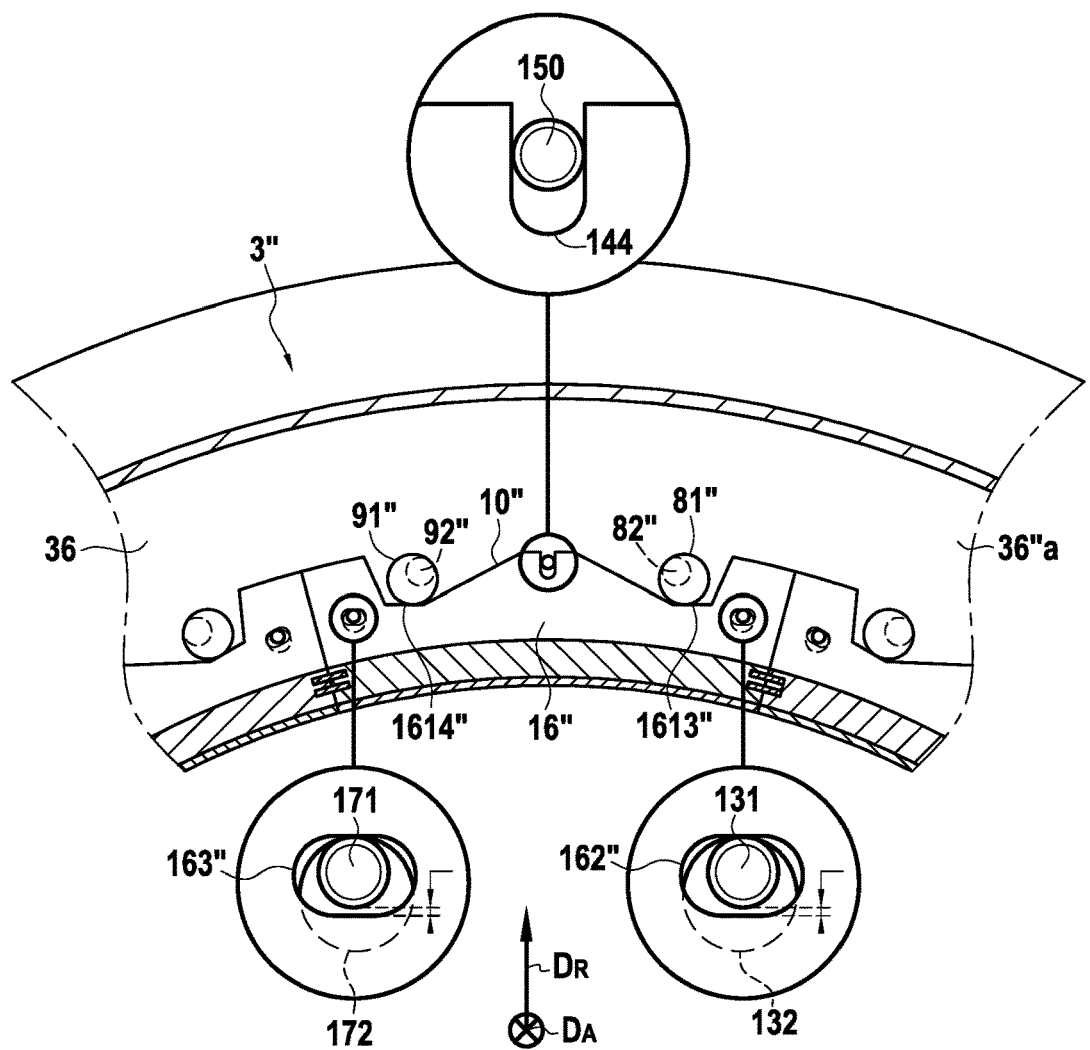
FIG. 13 is a section view of the FIG. 11 turbine ring assembly on section plane XIII shown in FIG. 11.

Radial clearance J2" is present when cold between the first and second openings 162", 163" of the downstream tab 16" and the clamps 131, 171 present in said first and second openings (FIG. 13). The clamps 131 and 171 are in contact with portions of the respective openings 162", 163" in a zone where there is no clearance. It is thus possible, while cold, to hold the ring sectors without clearance where they are mounted on the ring support structure, while providing static clearance while cold between the holder elements secured to the annular flanges of the ring support structure and the openings present in the tabs of the ring sectors.

In the presently-described embodiment, each of the first and second openings 163" and 163" is of a shape that is oblong extending in the circumferential direction of the turbine ring. The eccentric clamping elements 130 and 170 are made of a material having a coefficient of thermal expansion greater than the coefficient of thermal expansion of the ceramic matrix composite material of the ring sectors. Expansion when hot of the clamps 131 and 171 in the first and second openings 162" and 163" contributes to holding the ring sectors 10" on the ring support structure 3", the clearance J2" being reduced or eliminated by the expansion of the clamps 131 and 171.

The downstream tab 16" of each ring sector 10" also includes a housing, specifically a cutout 164, receiving a centering element, specifically a peg 150, that is secured to the downstream annular radial flange 36".

By using two openings of oblong shape in each tab of the ring sectors, relative movement between the ring support structure and the ring sectors is caused to be symmetrical. This serves to conserve good coincidence between the middle axis of each ring sector and the equivalent radius of the ring support structure. The centering element serves to avoid any off-centering of the ring sectors during thermal expansions.

In addition, by using eccentric clamping elements for each holder element, the capacity for adjusting the radial height of the ring sectors relative to the ring support structure is further increased and consequently so is the capacity for adjusting the clearance between the ring sectors.

Figure 10:
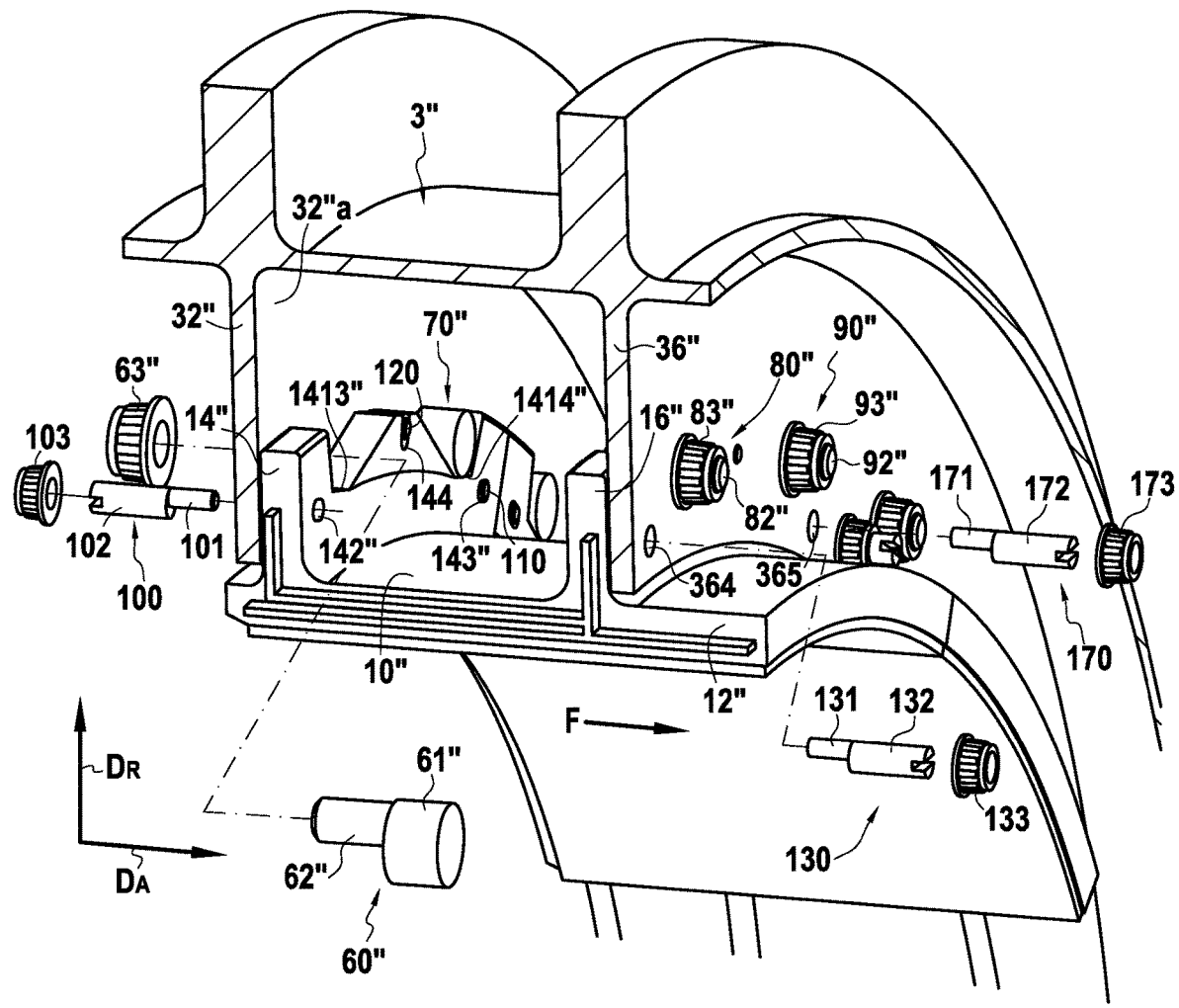
FIG. 10 is a first diagrammatic perspective view of another embodiment of a turbine ring assembly of the invention.
Figure 11:
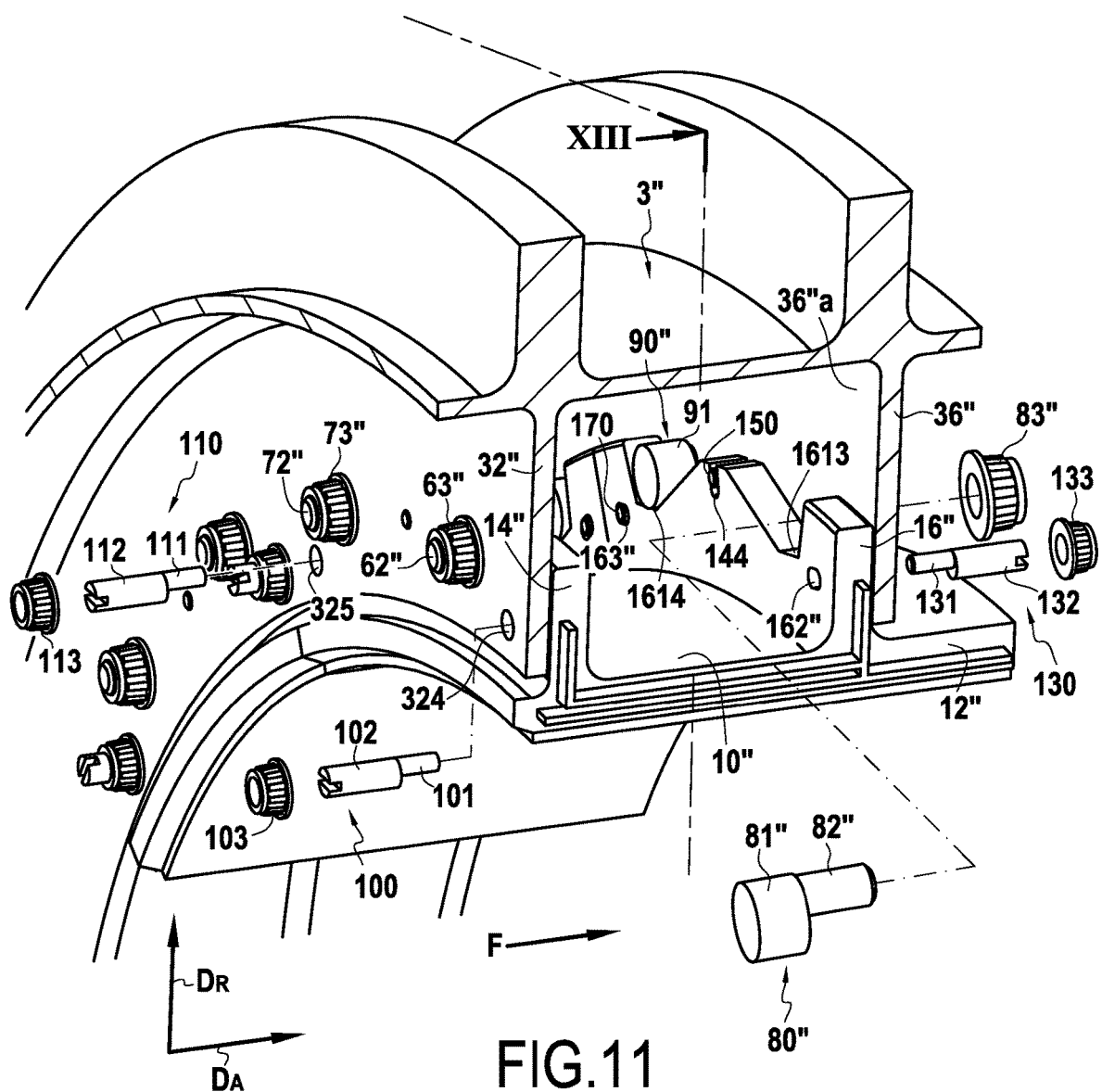
FIG. 11 is a second diagrammatic perspective view of the FIG. 10 turbine ring assembly.
Figure 12:
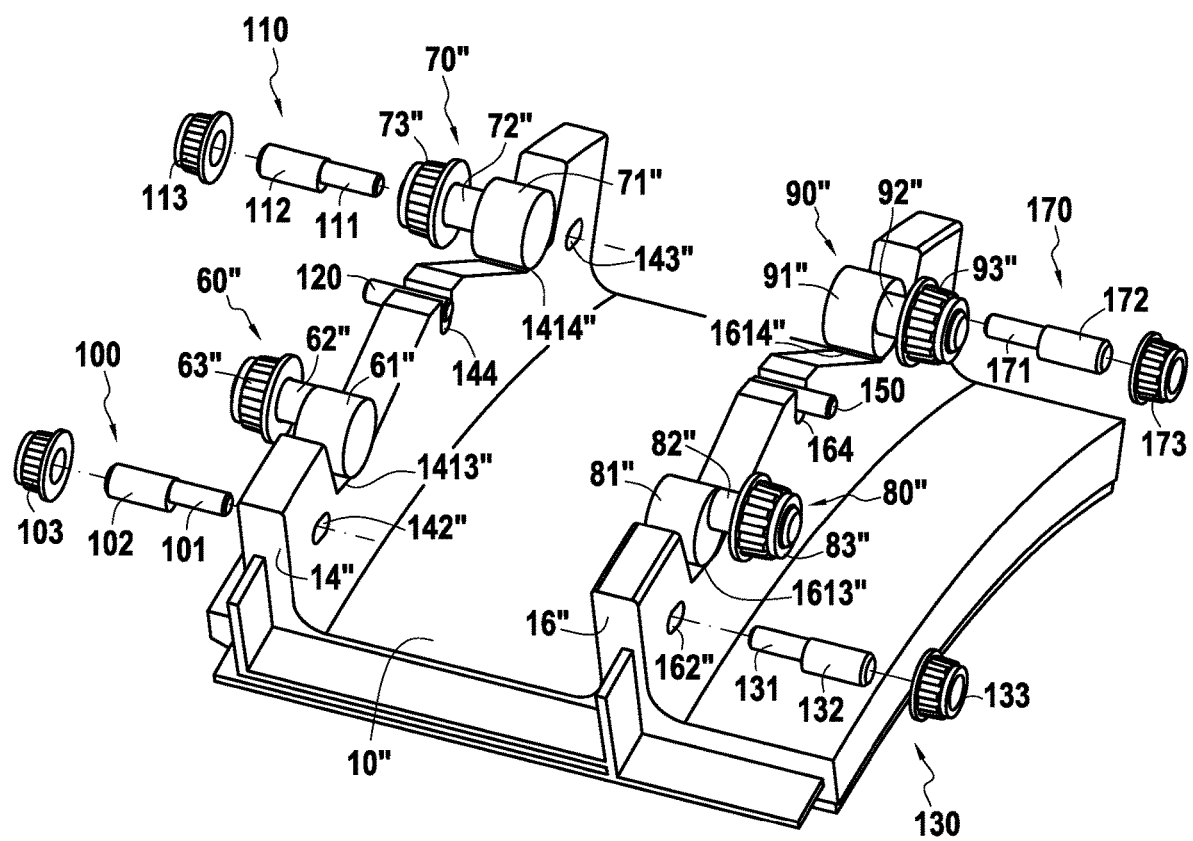
FIG. 12 is a diagrammatic perspective view of a ring sector of the turbine assembly of FIGS. 10 and 11.

Like the high-pressure turbine ring assembly described above with reference to FIGS. 6 to 9, and as shown in FIGS. 10 and 11, the upstream annular radial flange 32" of the ring support structure 3" has, on its face 32a" facing the upstream tabs 14" of the ring sectors 10", a plurality of clamps 61" and 71" belonging to respective eccentric clamping elements 60"

and 70" and corresponding to thrust portions for the clamps to thrust against the ring sectors. Each eccentric clamping element 60", 70" has a respective threaded shank 62", 72" that is placed in a respective orifice 322", 323" present in the flange 32". A clamp 61", 71", specifically in the form of a cylindrical peg, is fastened in eccentric manner to the corresponding threaded shank 62", 72". On their sides facing the face 32*a*" facing the upstream tabs 14", the clamps 61", 71" are held in determined positions by tightening respective nuts 63", 73" on the respective threaded shanks 62", 72".

When cold, thrust surfaces 1413" and 1414" present on the upstream tab 14" are respectively in contact with the two clamps 61" and 71" present on the face 32*a*" of the flange 32" facing the upstream tab 14" of each ring sector 10". More precisely, each clamp 61", 71" extends in the axial direction $D_A$ projecting from the face 32*a*" of the upstream annular radial flange 32" facing the upstream tabs 14" of the ring sectors 10". While cold, the thrust surfaces 1413" and 1414" are in contact with the surfaces of the respective clamps 61" and 71" that are at the bottom in the radial direction $D_R$, thus providing radial abutment of the thrust surfaces 1413" and 1414" against the clamps 61" and 71".

At the downstream end, the downstream annular radial flange 36" of the ring support structure 3" includes, on its face 36*a*" facing the downstream tabs 16" of the ring sectors 10", a plurality of clamps 81" and 91" belonging to respective eccentric clamping elements 80" and 90" and corresponding to thrust portions where the clamps thrust against the ring sectors. Each eccentric clamping element 80", 90" has a respective threaded shank 82", 92" that is placed in a respective orifice 362", 363" present in the flange 36". A respective clamp 81", 91", specifically in the form of a cylindrical peg, is fastened in eccentric manner on the respective threaded shank 82", 92". On their sides facing the face 36*a*" facing the downstream tab 16", the clamps 81", 91" are held in determined positions by tightening respective nuts 83", 93" on the respective threaded shanks 82", 92".

When cold, thrust surfaces 1613" and 1614" present on the downstream tab 16" are respectively in contact with the two clamps 81" and 91" present on the face 36*a*" of the flange 36" facing the downstream tab 16" of each ring sector 10". More precisely, each clamp 81", 91" extends in the axial direction $D_A$ projecting away from the face 36*a*" of the downstream annular radial flange 36" facing the downstream tabs 16" of the ring sectors 10". When cold, the thrust surfaces 1613" and 1614" are in contact with the respective surfaces of the clamps 81" and 91" that are at the bottom in the radial direction $D_R$, thereby providing radial abutment of the thrust surfaces 1613" and 1614" against the clamps 81" and 91".

By using the eccentric clamping elements 60", 70", 80", 90", 100, 110, 130, and 140, it is possible to adjust the thrust when cold between the ring sectors and the ring support structure.

Figure 14:
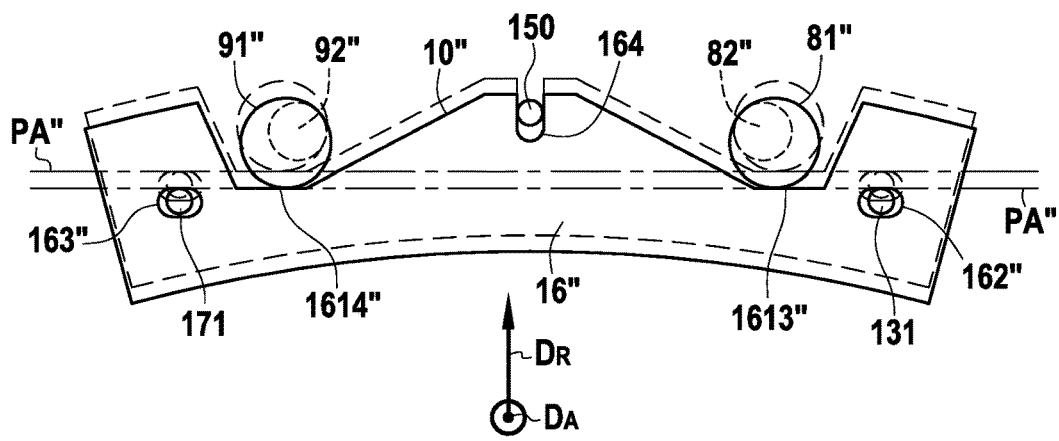
FIG. 14 is a section view of a ring sector of the turbine ring assembly of FIGS. 10 and 11.

As shown in FIG. 14, the two thrust surfaces 1613" and 1614" present on the downstream tab 16" lie in a common first thrust plane PA". The top edge of the first opening 162" of oblong shape present in the downstream tab 16" is in alignment with the first thrust plane PA", while the top portion of the second opening 163" present in the downstream tab 16" is tangential to the first thrust plane PA". Thus, all of the thrust points or zones of the downstream annular radial flange 36" constituted firstly by the clamps 81" and 91" and secondly by the clamps 101 and 111 for thrusting against the downstream tab 16" of each ring sector 10" are in alignment on the same thrust plane PA. This alignment of the contact zones on a thrust plane serves to avoid any relative movement in the radial direction associated with differences in coefficients of thermal expansion, and to conserve the same contact zones, both when cold and when hot (the respective positions when cold and when hot of the contact zones between the thrust points of the downstream annular radial flange and the downstream tab being drawn respectively in continuous lines and in dashed lines in FIG. 9).

Likewise, the two thrust surfaces 1413" and 1414" present on the upstream tab 14" extend in a common second thrust plane (not shown in FIGS. 10 to 14). The top edge of the first opening 142" of oblong shape present in the upstream tab 14" is in alignment with the second thrust plane, while the top portion of the second opening 143" present in the upstream tab 14" is tangential to the second thrust plane. Thus, all of the thrust points or zones of the upstream annular radial flange 32" constituted firstly by the clamps 61" and 71" and secondly by the clamps 131 and 171 for thrusting against the upstream tab 14" of each ring sector 10" are in alignment on the same thrust plane. This alignment of the contact zones on a thrust plane serves to avoid any relative movement in the radial direction associated with differences of coefficients of thermal expansion, and to conserve the same contact zones both when cold and when hot.

The holder elements and the thrust portions for each ring sector may be placed in aligned manner in the radial direction as in the embodiment of FIGS. 1 to 4. The holder elements may equally well be placed outside the thrust portions in the circumferential directions of each ring sector, as in the embodiments of FIGS. 6 to 14. Finally, the holder elements may also be placed inside the thrust portions in the circumferential direction for each ring sector.

The invention claimed is:

1. A turbine ring assembly comprising both a plurality of ring sectors made of ceramic matrix composite material to form a turbine ring, and also a ring support structure having first and second annular flanges, each ring sector having a portion forming an annular base with, in a radial direction of the turbine ring, an inner face defining an inside face of the turbine ring and an outer face from which there extend first and second tabs, the first and second tabs of each ring sector being held between the first and second annular flanges of the ring support structure;

wherein the first tab of each ring sector includes a first opening receiving a portion of a first holder element secured to the first annular flange and a second opening receiving a portion of a second holder element secured to the first annular flange, radial clearance being present when cold between the first and second openings in the first tab and the portions of the first and second holder elements present in said first and second openings, said first and second holder elements being made of a material having a coefficient of thermal expansion that is greater than the coefficient of thermal expansion of the ceramic matrix composite material of the ring sectors, the first opening of the first tab presenting a shape that is oblong extending in the circumferential direction of the turbine ring;

wherein the second tab of each ring sector includes a first opening receiving a portion of a third holder element secured to the second annular flange and a second opening receiving a portion of a fourth holder element secured to the second annular flange, radial clearance being present when cold between the first and second openings in the second tab and the portions of the third and fourth holder elements present in said first and second openings, said third and fourth holder elements being made of a material having a coefficient of thermal expansion that is greater than the coefficient of thermal expansion of the ceramic matrix composite material of the ring sectors, the first opening of the second tab presenting a shape that is oblong extending in the circumferential direction of the turbine ring, the first and second openings of the first tab being in axial alignment with the first and second openings of the second tab;

wherein the first, second, third and fourth holder elements are separate holder elements;

wherein the first annular flange includes on its face facing the first tab of each ring sector a plurality of thrust portions distributed circumferentially over the first flange, an end of the first tab of each ring sector when cold being in radial abutment against two thrust portions; and wherein the second annular flange includes on its face facing the second tab of each ring sector a plurality of thrust portions distributed in circumferential manner over the second flange, an end of each second tab of each ring sector when cold being in radial abutment against two thrust portions.

2. The assembly according to claim 1, wherein the first and second holder elements are formed respectively by first and second pegs secured to the first annular flange and wherein the third and fourth holder elements are formed respectively by third and fourth pegs secured to the second annular flange.

3. The assembly according to claim 1, wherein the thrust portions present on the first and second annular flanges are spaced apart from each other by a recessed portion extending in a circumferential direction.

4. The assembly according to claim 1, having a plurality of adjustable eccentric clamping elements, each clamping element having a clamp fastened eccentrically on the clamping element, each clamp forming a thrust portion present on the first and second annular flanges.

5. The assembly according to claim 1, wherein the first tab of each ring sector has two thrust surfaces in contact respectively with two thrust portions of the first annular flange, the two thrust surfaces extending in a common first thrust plane, a top edge of the first opening of oblong shape of the first tab being in alignment with the first thrust plane, a top portion of the second opening of the first tab being tangential with said first thrust plane, and wherein the second tab of each ring sector has two thrust surfaces in contact respectively with two thrust portions of the second annular flange, the two thrust surfaces of the second tab extending in a common second thrust plane, a top edge of the first opening of oblong shape of the second tab being in alignment with the second thrust plane, a top portion of the second opening of the second tab being tangential with said second thrust plane.

6. The assembly according to claim 1, wherein the second opening of the first tab of each ring sector presents an oblong shape, a top edge of the second opening of oblong shape of the first tab being in alignment with a first thrust plane, and wherein the second opening of the second tab of each ring sector presents an oblong shape, a top edge of the second opening of oblong shape of the second tab being in alignment with a second thrust plane (PA), the end of the first tab of each ring sector including a recess situated between two thrust surfaces of the first tab and receiving a centering element secured to the first annular flange, the end of the second tab of each ring sector including a recess situated between two thrust surfaces of the second tab and receiving a centering element secured to the second annular flange.

7. The assembly according to claim 1, wherein the first and second holder elements secured to the first radial flange and the first and second holder elements secured to the second radial flange are each formed by an adjustable eccentric clamping element.

* * * * *